June 24, 1930.  L. EDELMANN  1,767,439
SPECIFIC GRAVITY TESTER
Filed Oct. 19, 1926   2 Sheets-Sheet 2

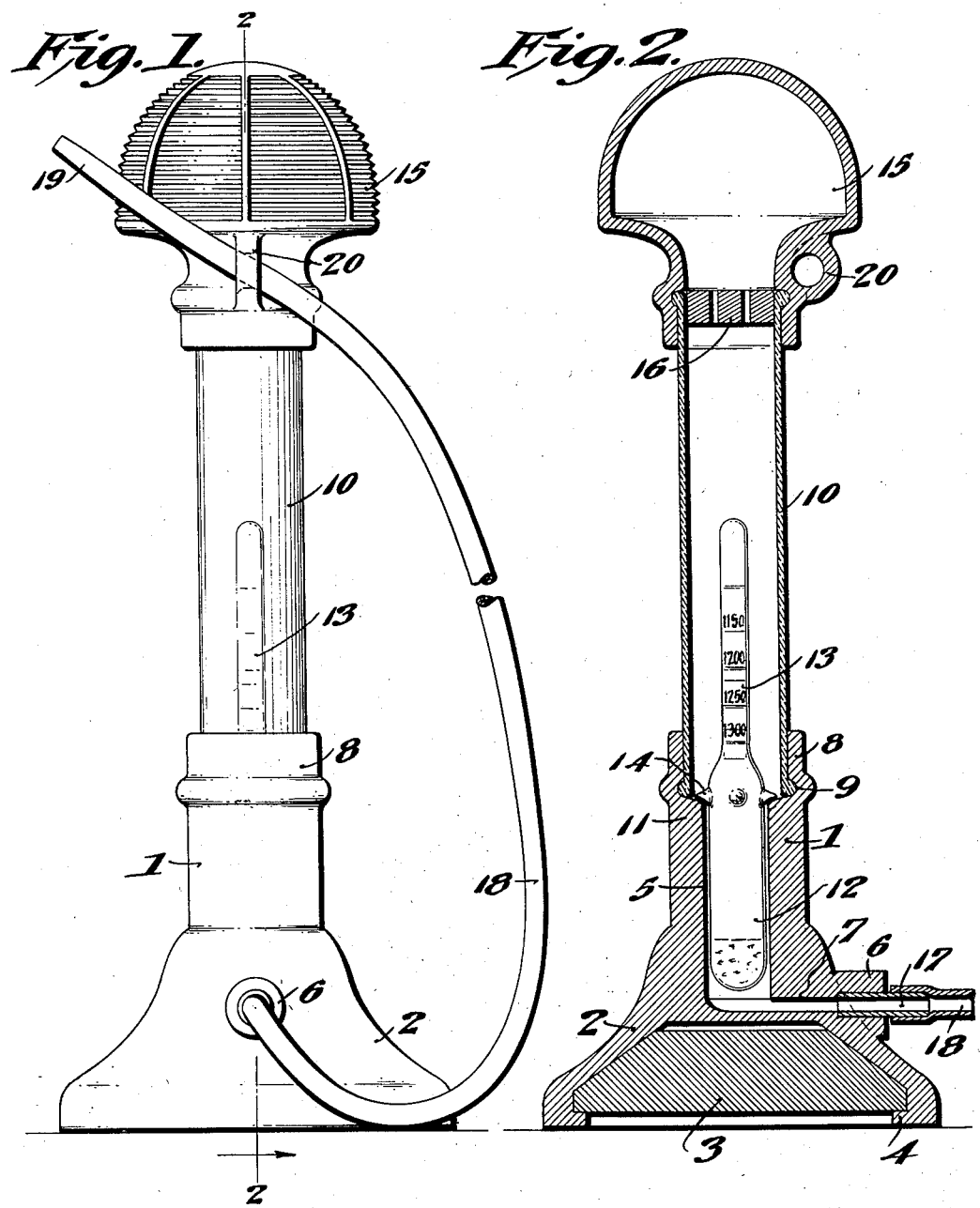

Inventor
Leo Edelmann
By Lloyd W. Patch
Attorney

Patented June 24, 1930

1,767,439

UNITED STATES PATENT OFFICE

LEO EDELMANN, OF CHICAGO, ILLINOIS, ASSIGNOR TO E. EDELMANN & CO., OF CHICAGO, ILLINOIS, A CORPORATION OF ILLINOIS

SPECIFIC-GRAVITY TESTER

Application filed October 19, 1926. Serial No. 142,690.

This invention relates to improvements in specific-gravity testers, and particularly to a structure of this character intended and adapted for use in testing the liquid of storage batteries used with radio sets and in other like connections.

An object of this invention is to provide a specific gravity tester of the syringe hydrometer type which can be placed and supported at a distance from the battery or other liquid container, and which will operate efficiently to extract and return the liquid without danger of accidental spilling or leakage of the battery acid or other liquid being tested.

A further object is to provide a specific gravity tester which can be placed to stand upon a table or other convenient support, without danger of tilting or toppling over, and which has an extension nozzle so that the liquid in one or several battery cells or other containers can be extracted and returned without the necessity of moving or shifting the main tester structure.

Another object resides in providing means by which the extension spout is supported and held, when not in use, with the intake and discharge nozzle end thereof disposed upwardly to positively prevent leakage or dripping of any acid or liquid which may not have been expelled following use.

Still another object is to so construct the parts that the usual glass or other frangible float barrel is protected and cushioned against contact and shocks due to dropping and the like.

With the above and other objects in view, which will be apparent to those skilled in the art, my invention includes certain novel features of construction and combinations of parts which will be hereinafter set forth in connection with the drawings.

In the drawings:

Figure 1 is a view in side elevation of my improved tester structure with the extension nozzle in the position in which it is supported when not in use.

Fig. 2 is a vertical sectional view through the structure substantially on line 2—2 of Fig. 1.

Figs. 5 and 6 show still other modifications which might be referred to.

Figure 3:
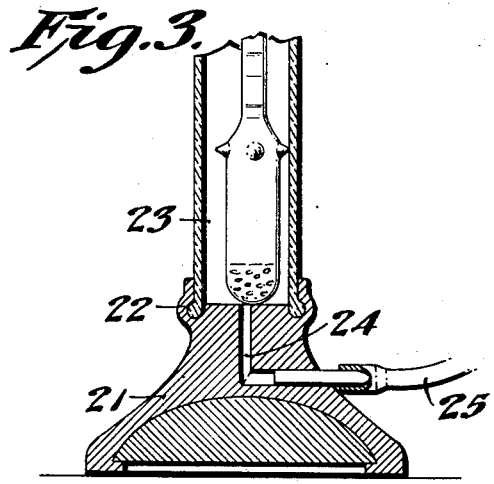
Figs. 3 and 4 illustrate a slightly modified form of the construction of the structure shown in Figs. 1 and 2.

The supporting member 1 has a widened supporting base 2 which is recessed on its lower side to receive a metal slug 3, or any other suitable weight which will serve to retain the balance of the supporting member so that it will stand in an upright relation upon the widened base 2. A flange 4 is provided to retain the weight 3 in place and to guard against scratching a table or other surfaces upon which the instrument may be supported.

The supporting member 1 has a float chamber 5 therein and a laterally extending nipple 6 with a passage 7 therethrough communicating with the bottom end of the float chamber 5. At its upper end the supporting member 1 has a connecting sleeve 8 provided with a groove 9 to receive one end of the glass or other transparent float barrel 10. A shoulder 11 is provided between the groove 9 and the float chamber 5, and this chamber 5 is of sufficient internal diameter to loosely receive the float end 12 of a hyrometer element 13 placed within the transparent barrel 10. The hydrometer element 13 has the spur-like points or projections 14 extending laterally therefrom adjacent the upper end of the float chamber 12 and these points or spurs serve the double purpose of minimizing frictional contact between the hydrometer element and the barrel 10, and of supporting the hydrometer within the float chamber 5 of the supporting member 1, due to the fact that the spurs engage with and rest upon the shoulder 11.

At its upper end the barrel 10 carries a suction and compression bulb 15 which can be of any desired form and type. A perforated plug or stop 16 is inserted in the upper end of the barrel 10 to retain the hydrometer element within the barrel 10.

A coupling member 17 connects the extension nozzle or hose 18 with the nipple 6, and a direct passage is thus established from the intake and discharge end 19, of this extension nozzle 18, to the float chamber 5 and the barrel 10. The bulb 15 has a ring or loop 20 thereon to receive the intake and discharge end 19 of the extension nozzle, substantially as shown in Fig. 1, when the device is not in use so that this discharge end is held and supported with the outlet opening upwardly to positively prevent dripping or leakage of battery acid or other liquid. When the end 19 is fitted through loop 20 the main portion of the extension nozzle is below the loop and this weight will consequently tend to twist the nozzle sidewise within the opening to bind the same frictionally in place and guard against accidental displacement.

In the use of my improved specific gravity tester, the device is placed upon a table or other convenient support in a standing position, the widened base 2 giving a broad support and the weight at 3 serving to maintain the instrument in an upright relation and to prevent tilting or toppling of the same. The end of the extension nozzle is withdrawn from the loop 20 and can be moved to any desired position for insertion through the filling opening of storage battery cells or other liquid containers to take up battery acid or any other liquid which is to be tested. The bulb 15 is squeezed to expell air and is of sufficient resiliency to expand and suck or draw liquid from the extension nozzle 18 into the float chamber 5 and barrel 10 to float the hydrometer element 13 in proper relation. When bulb 15 is again squeezed the liquid is expelled, and when the tests have been completed the nozzle 18 has its end 19 again inserted through the loop 20 so that the extension nozzle is held in substantially the relation shown in Fig. 1 in which position there is no possibility of liquid leaking or dripping from the nozzle.

By mounting the widened extension supporting base 2 at one end of the frangible barrel 10 and the widened out bulb 15 at the remaining end, I have provided a structure with which the glass barrel 10 is fully protected against breakage or contact with the floor or other surfaces in case the instrument is dropped.

With the construction of the parts as illustrated in Fig. 3 the float chamber 5 is dispensed with and the widened and weighted base member 21 has a sleeve 22 thereon to receive the lower end of the float barrel 23. A liquid passage 24 is provided to open out at one side and the extension hose 25 is led from this passage.

Figure 4:
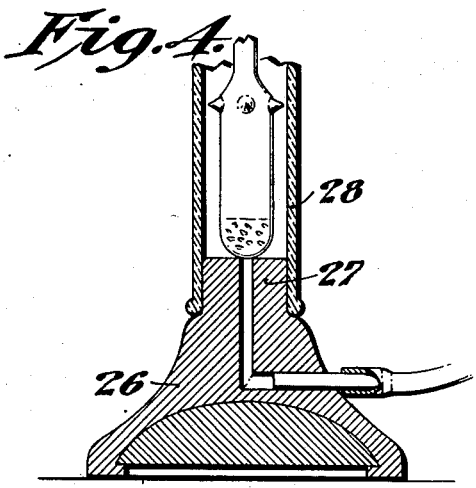

As shown in Fig. 4, the base 26 has a plug or stopper extension 27 thereon which will have a liquid tight fit inside the lower end of the barrel 28. Other connections and assemblies, many of which are now known and old, might be employed to associate the barrel and the supporting base.

Figure 5:
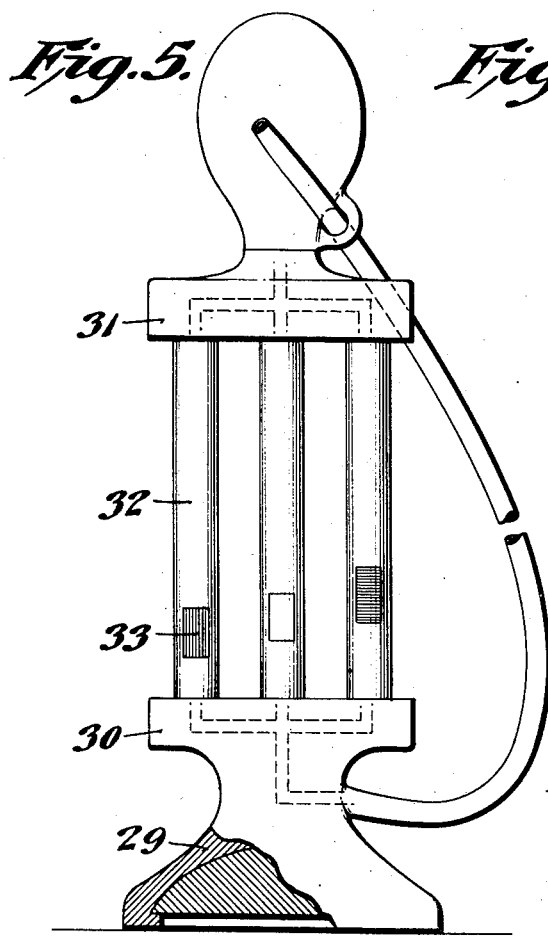

With the construction illustrated in Fig. 5 the base 29 has a widened head 30 thereon and a similar widened head 31 is provided in conjunction with the suction bulb. A plurality of float tubes 32 are mounted between the heads 30 and 31 and a float 33 is movable within each of the tubes. These floats 33 are of different density or will be otherwise gauged to sink and float, as the case may be, to give the desired readings and density indications. The floats 33 might be variously colored to more readily indicate readings.

Figure 6:
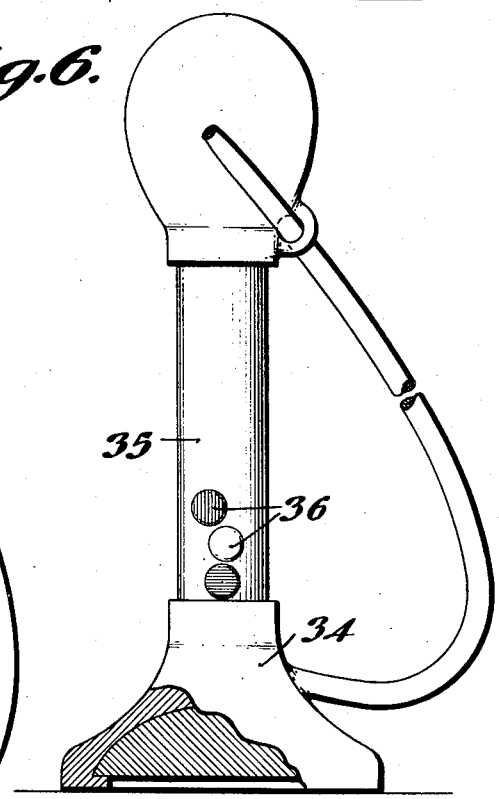

With the construction shown in Fig. 6 the base 34 has a single float barrel 35 associated therewith and the several floats 36 are within this barrel.

The extension tubes or nozzles of the two modified forms shown in Figs 5 and 6 can be of any desired length and it is preferable that the bulbs be provided with loops or rings to receive the open ends of the tubes when not in use. Other types of syringe bulbs or suction means might be employed and the base supporting portions can be made of various materials to suit different requirements of use.

While I have herein shown and described only certain particular constructions and embodiments of the various features of my invention, it will be appreciated that other changes and variations can be made in the form and construction and also in the assembly of the parts without departing from the spirit and scope of my present invention.

I claim:

1. A specific gravity tester comprising a float chamber, a widened base to support said float chamber in a standing position, a hydrometer element within said chamber, an extension nozzle connected with the lower end of the float chamber, means to draw liquid into said float chamber through said nozzle, and means to support said extension nozzle with the discharge opening thereof disposed upwardly when not in use.

2. A specific gravity tester comprising a supporting member having a float chamber therein, a hydrometer float in said chamber, a widened supporting base to hold the supporting member in upright relation, weight means carried by the supporting base to maintain the same against tilting and toppling, a nozzle connected with the lower end of the float chamber, and means to draw liquid into said float chamber through the nozzle.

3. A specific gravity tester comprising a supporting member having a float chamber therein, a widened supporting base to hold the supporting member in upright relation, weight means carried by the supporting base to maintain the same against tilting and toppling, a nozzle connected with the lower end of the float chamber, a float barrel connected with the supporting member at the upper end of the float chamber and of greater internal diameter than the float chamber to provide a shoulder at the upper end of said float chamber, a hydrometer element placed within the float chamber and barrel and movable therein, extension spurs on the hydrometer element to hold the same from contact with the barrel and to engage the shoulder to support the hydrometer element in a position of rest, and a bulb carried at the upper end of the float barrel to draw liquid through the nozzle into the float chamber and barrel.

4. A specific gravity tester comprising a supporting member having a float chamber therein, a widened supporting base to hold the supporting member in upright relation, weight means carried by the supporting base to maintain the same against tilting and toppling, a nozzle connected with the lower end of the float chamber, a float barrel connected with the supporting member at the upper end of the float chamber and of greater internal diameter than the float chamber to provide a shoulder at the upper end of said float chamber, a hydrometer element placed within the float chamber and barrel and movable therein, extension spurs on the hydrometer element to hold the same from contact with the barrel and to engage the shoulder to support the hydrometer element in a position of rest, a bulb carried at the upper end of the float barrel to draw liquid through the nozzle into the float chamber and barrel, and a loop carried by the bulb to receive the discharge end of the nozzle to hold the same with the discharge opening disposed upwardly when not in use.

5. A specific gravity tester intended for portable hand use comprising a frangible float barrel, a hydrometer element movable in said barrel, a bulb at one end of greater diameter than the barrel, and a supporting base at the remaining end upon which the tester is set to rest in an upright relation also of greater diameter than the frangible barrel.

6. A specific gravity tester intended for portable hand use comprising a float barrel, a hydrometer element movable within the barrel, a widened base at one end of the barrel by which the same is supported to stand in an upright relation, and a bulb at the upper end of the barrel.

7. A specific gravity tester intended for portable hand use comprising a float barrel, a hydrometer element movable within the barrel, a supporting base at one end of the barrel widened to stand the barrel in an upright relation, a balancing weight associated with the supporting base to maintain the barrel against tilting and toppling, and suction means carried by the upper end of the barrel.

In testimony whereof I hereunto affix my signature.

LEO EDELMANN.